United States Patent
Dreier

(10) Patent No.: US 7,179,846 B2
(45) Date of Patent: Feb. 20, 2007

(54) SOUNDPROOFING AND THERMALLY INSULATING STRUCTURAL ELEMENT

(75) Inventor: Thorsten Dreier, Düsseldorf (DE)

(73) Assignee: Bayer MaterialScience AG, Leverkusen (DE)

(*) Notice: Subject to any disclaimer, the term of this patent is extended or adjusted under 35 U.S.C. 154(b) by 88 days.

(21) Appl. No.: 10/796,439

(22) Filed: Mar. 9, 2004

(65) Prior Publication Data

US 2004/0180978 A1 Sep. 16, 2004

(30) Foreign Application Priority Data

Mar. 13, 2003 (DE) .............................. 103 10 907

(51) Int. Cl.
*C08G 18/06* (2006.01)
*B32B 27/40* (2006.01)

(52) U.S. Cl. ................ 521/155; 428/423.1; 428/425.6; 428/425.8; 521/170

(58) Field of Classification Search ................ 521/170, 521/155; 428/425.8, 425.6, 423.1
See application file for complete search history.

(56) References Cited

U.S. PATENT DOCUMENTS

| | | | |
|---|---|---|---|
| 4,073,991 A | 2/1978 | Focht | 428/138 |
| 5,563,180 A | 10/1996 | Skowronski et al. | 521/125 |
| 5,770,635 A * | 6/1998 | Lee et al. | 521/129 |
| 6,033,756 A * | 3/2000 | Handscomb | 428/138 |
| 6,075,064 A * | 6/2000 | Muller et al. | 521/174 |
| 2002/0179367 A1 | 12/2002 | Becker et al. | 181/293 |

FOREIGN PATENT DOCUMENTS

| | | |
|---|---|---|
| WO | 99/44816 | 9/1999 |
| WO | 02/083461 A1 | 10/2002 |

* cited by examiner

*Primary Examiner*—John M. Cooney, Jr.
(74) *Attorney, Agent, or Firm*—Joseph C. Gil; Lyndanne M. Whalen

(57) ABSTRACT

A structural element of closed-cell polyurethane rigid foam, with good thermal insulation and improved sound absorption is achieved by means of surface depressions satisfying specified criteria.

10 Claims, 1 Drawing Sheet

SOUNDPROOFING AND THERMALLY INSULATING STRUCTURAL ELEMENT

BACKGROUND OF THE INVENTION

The present invention relates to a structural element of closed-cell polyurethane rigid foam having good thermal insulation and improved sound absorption characteristics.

Polymer foam panels, in particular, polyurethane rigid foams, are used in a variety of applications for building insulation. In the roof insulation sector, panels between 40 mm and 180 mm thick are used, for example, as mountable insulation materials. The main object of these panels is to ensure thermal insulation. For this purpose, the materials used generally have a thermal conductivity in the range from 20 to 35 mW/mK. If flexible outer layers are used, this thermal conductivity value can be improved still further. In addition, a compression strength of at least 0.10 N/mm$^2$ must be provided because the load-bearing capacity for roofing materials must be ensured when laying these panels. Panel materials that in addition to thermal insulation also ensure sound insulation against external noise and that also prevent sound conduction between rooms, in particular in a frequency range from 1000 Hz to 5000 Hz, would be advantageous.

Surface-compacted, perforated polyurethane foam molded parts used for insulating apparatus housings are described in DE-A 199 62 865. Sound absorption is achieved by virtue of the fact that the skin-covered foams are pierced in the vicinity of the surface and the soundwaves can thus penetrate the foam. A disadvantage, however, is that the foams described therein have neither sufficient compression strengths nor thermal insulating properties.

SUMMARY OF THE INVENTION

It has now been found that the sound absorption effect of a closed-cell polyurethane rigid foam that normally does not guarantee protection against sound can be significantly improved in the frequency range from 1000 to 5000 Hz if the surface depressions are of different sizes. The good thermal insulating properties of the closed-cell polyurethane foams are affected only slightly by these perforations.

BRIEF DESCRIPTION OF THE DRAWING

The FIGURE depicts the sound absorption of each of the foams produced in Examples 1–6.

DETAILED DESCRIPTION OF THE INVENTION

Figure 1:
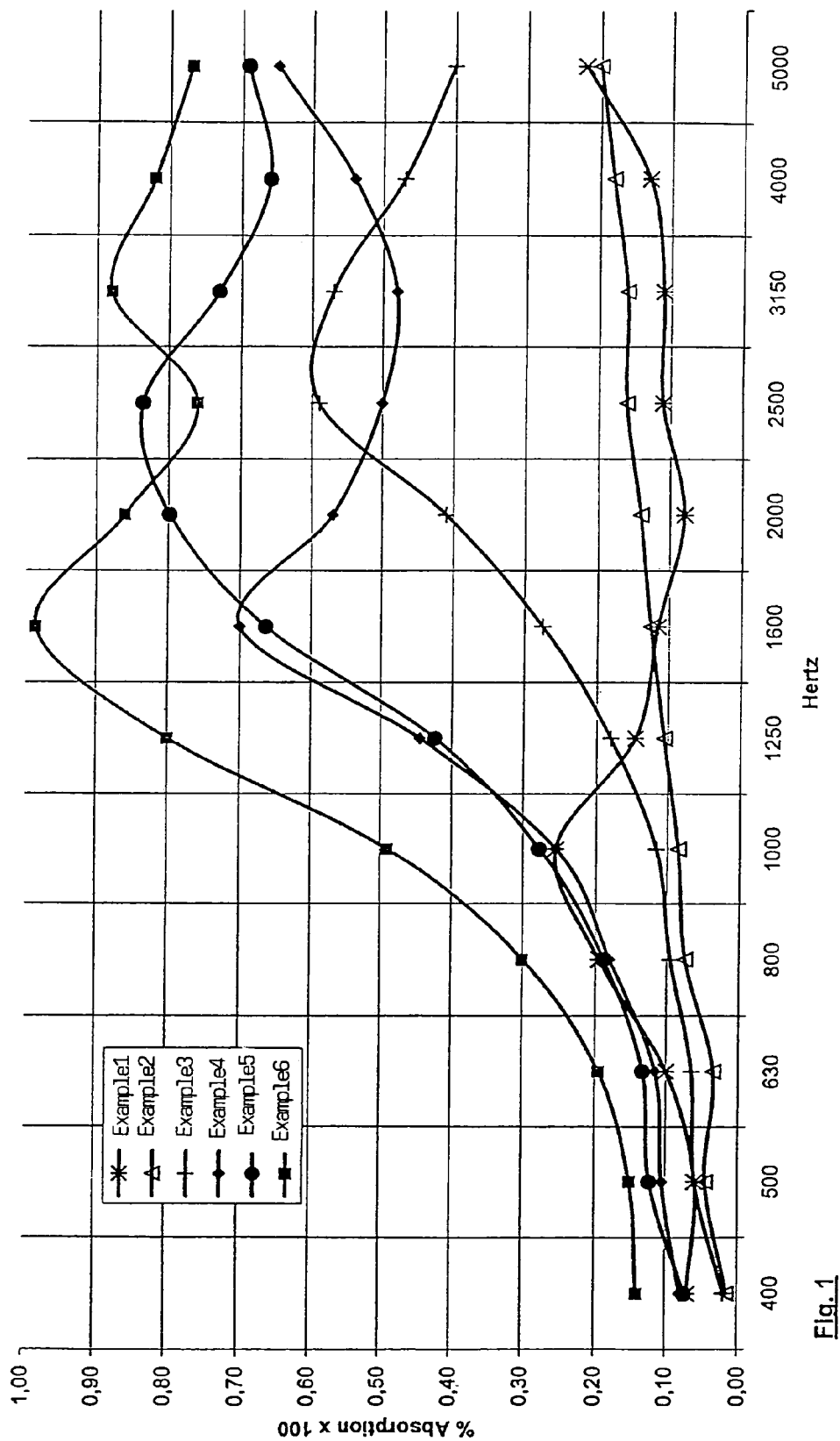

The present invention provides a soundproofing and thermally insulating structural element containing a panel of polyurethane rigid foam with a proportion of closed cells of more than 90%, whose surface comprises per cm$^2$ from 1 to 18 depressions of diameter 0.1 to 10 mm and of depth from 1 to 7 cm, in which at least two types of depressions are present that differ in at least one dimension.

The surface of the structural element has depressions of from 0.1 to 10 mm in diameter, most preferably 0.2 to 4 mm in diameter. The depressions may be circular, oval, cross-shaped or slit-shaped, and combinations of various shapes may be employed. The depth of the depressions is 0.1 to 7 cm, preferably 1 to 4 cm, and is less than the thickness of the panel. The difference between the depth of the depressions and the thickness of the panel is preferably at least 5 mm.

The number of depressions in a surface of the structural element is 1 to 18 per cm$^2$, preferably 4 to 15 per cm$^2$. The structural element may have depressions on the front or rear side or on both sides.

It has also been found that the use of outer layers leads to an improvement in the sound-absorbing properties of the structural element according to the invention.

In this context either only one side of the polyurethane rigid foam panel of the structural element or alternatively, both sides may be provided with an outer layer. The front and rear sides may be provided with identical or different outer layers. Mineral fleece with bulk densities of 40 to 80 kg/m$^3$ is preferably used as the outer layer. Natron kraft paper, bituminized paper, bituminized felt, crepe paper, polyethylene-coated glass fleece and aluminum foils may, however, also be used as the outer layer. The thickness of the outer layer(s) used depends on the material being used. A thickness of 0.03 mm is suitable, for example, for aluminum foil. A thickness of up to 3 mm is suitable for bituminized felt. Other suitable outer layers are described in G. Oertel (Editor): "Polyurethane", 3$^{rd}$ Edition, Carl Hanser Vlg., Munich 1993, p. 272 ff. In a preferred embodiment, the structural element has on the front side facing the sound an outer layer of mineral fleece, and has on the rear side remote from the sound an outer layer of aluminum foil.

Closed-cell systems with a density between 20 and 120 kg/m$^3$, preferably 20 to 80 kg/m$^3$ and most preferably 25 to 40 kg/m$^3$ are used as the polyurethane rigid foam. The polyurethane rigid foam is typically foamed at an index (molar ratio of isocyanate groups to isocyanate-reactive groups multiplied by 100) of between 100 and 600, preferably 100 to 400.

The panels used in the structural elements of the present invention are produced by a process that is in principle known to the person skilled in the art. If an outer layer is used, this is preferably foamed directly during the production of the foam, for example in the production of panels with the double conveyor belt. The depressions are made in the foam by conventional mechanical methods, e.g., drilling, milling, etc.

EXAMPLES

A polyurethane rigid foam was produced by reacting the following components.

64 parts by weight of a polyester polyol based on adipic acid, phthalic anhydride and diethylene glycol, OH number 210 (commercially available under the name Desmophen® DE S-053, Bayer AG);

16 parts by weight of a polyether polyol of OH number 255, produced by reacting trimethylolpropane with a mixture of ethylene oxide and propylene oxide (commercially available under the name Desmophen® VP.PU 1657, Bayer AG);

160 parts by weight of a mixture of MDI isomers and their higher homologues (commercially available under the name Desmodur® 44V20, Bayer AG)

in the presence of 16 parts by weight of trichloropropyl phosphate (as the flameproofing agent);

13.2 parts by weight of n-pentane;

1.2 parts by weight of water;

1.6 parts by weight of a commercially available polyether/polysiloxane foam stabilizer (commercially available under the name Dabco® DC5598, Air Products);

3.6 parts by weight of a 25% potassium acetate solution in diethylene glycol; and 0.56 part by weight of dimethylcyclohexylamine.

A polyurethane rigid foam (index 236) having a density of 30 kg/m² an open-cell structure of 10 vol. % was obtained. The thermal conductivity according to DIN 52616 was 25.8 mW/mK (23° C.).

Example 1 (Comparison)

A flat molded part 40 mm thick, 200 mm long and 200 mm wide was cut from this rigid foam. The frequency-dependent sound absorption was measured according to ASTM E 1050-90 in a sound absorption tube of 30 mm and 90 mm diameter. The Figure shows the sound absorption of the sample. The thermal conductivity was 25.8 mW/mK.

Example 2 (Comparison)

A surface of a test body produced according to Example 1 was provided with cylindrical depressions 2 mm in diameter and 15 mm deep, the number of depressions being 5 per cm². The Figure shows the sound absorption of the sample. The thermal conductivity was 26.3 mW/mK.

Example 3 (Comparison)

A surface of a test body produced according to Example 1 was provided with cylindrical depressions 4 mm in diameter and 20 mm deep, the number of depressions being 5 per cm². The Figure shows the sound absorption of the sample. The thermal conductivity was 28.0 mW/mK.

Example 4

A surface of a test body produced according to Example 1 was provided with cylindrical depressions 2 mm in diameter and 15 mm deep (1 per cm²), with cylindrical depressions 4 mm in diameter and 20 mm deep (2 per cm²) as well as with cylindrical depressions 4 mm in diameter and 30 mm deep (2 per cm²). The Figure shows the sound absorption of the sample. The thermal conductivity was 29.4 mW/mK.

Example 5

A test body produced according to Example 1 was provided on one side (side facing the sound) with a commercially available Vliepatex® surface (mineral-coated glass fleece of density 50 g/m²). Cylindrical depressions 2 mm in diameter and 15 mm deep (1 per cm₂), cylindrical depressions 4 mm in diameter and 20 mm deep (2 per cm²) and cylindrical depressions 4 mm in diameter and 30 mm deep (2 per cm²) were then drilled into the surface. The Figure shows the sound absorption of the sample. The thermal conductivity was 30.7 mW/mK.

Example 6

A test body 50 mm thick produced similarly to Example 1 was provided on one side (side facing the sound) with a commercially available Vliepatex® surface (mineral-coated glass fleece of density 50 g/m²). Cylindrical depressions 4 mm in diameter and 20 mm deep (1 per cm²), cylindrical depressions 4 mm in diameter and 30 mm deep (2 per cm²) and cylindrical depressions 4 mm in diameter and 40 mm deep (2 per cm²) were then drilled in the surface. The Figure shows the sound absorption of the sample. The thermal conductivity was 32.2 mW/mK.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A soundproofing and thermally insulating element comprising a panel of polyurethane rigid foam with a proportion of closed cells of more than 90%, with a surface having 1 to 18 depressions per square centimeter, the depressions having a diameter of from 0.1 to 10 mm and a depth of from 10 to 70 mm, wherein at least two types of depressions that differ in at least one dimension are present.

2. The element of claim 1 in which depressions are present on both front and rear sides of the foam panel.

3. The element of claim 2 in which the panel of polyurethane rigid foam is provided with an outer layer on the front or rear side.

4. The element of claim 3 in which the outer layer is an aluminum foil or a mineral fiber fleece.

5. The element of claim 4 in which the panel of closed-cell polyurethane rigid foam is provided with an outer layer on the front and rear sides.

6. The element of claim 5 in which the outer layer on the front side of the foam panel is a different material than the outer layer on the rear side of the foam panel.

7. The element of claim 1 in which the panel of polyurethane rigid foam is provided with an outer layer on its front and rear sides.

8. The element of claim 7 in which the outer layer is an aluminum foil or mineral fiber fleece.

9. The element of claim 8 in which the foam panel is provided with an outer layer on both its front and rear sides.

10. The element of claim 9 in which the outer layer on the front side of the foam is a material different from that of the outer layer on the rear side of the foam.

* * * * *